United States Patent [19]

Grant et al.

[11] Patent Number: 4,954,832
[45] Date of Patent: Sep. 4, 1990

[54] APPARATUS FOR SIMULTANEOUSLY ROTATING A PLURALITY OF PARALLEL SHAFTS

[75] Inventors: Richard W. Grant, Manhattan Beach; Allen G. Storaasli, Hermosa Beach, both of Calif.

[73] Assignee: Hughes Aircraft Company, Los Angeles, Calif.

[21] Appl. No.: 693,954

[22] Filed: Jan. 23, 1985

[51] Int. Cl.[5] .............................................. F16H 33/00
[52] U.S. Cl. ...................................... 342/352; 74/86; 74/665 G; 475/6
[58] Field of Search ................ 333/258, 259; 342/352; 343/762, 775, 776, 777; 74/660, 665 G, 665 GA, 802, 52, 86; 200/38 B, 38 R, 178, 179, 115, 17, 18; 408/47

[56] References Cited

U.S. PATENT DOCUMENTS 471,337  3/1892  Humpheys ............................ 74/660
3,979,971  9/1976  Generke et al. ........................ 74/802

Primary Examiner—Thomas H. Tarcza
Assistant Examiner—Mark Hellner
Attorney, Agent, or Firm—S. M. Mitchell; M. J. Meltzer; A. W. Karambelas

[57] ABSTRACT

Apparatus is provided for simultaneously rotating a plurality of parallel shafts connected, for example, to an array of rf switches that feed energy to or from an array of antenna feed horns. Each shaft is connected by a separate crank to a planar drive plate that is controllable moved relative to the switches in an orbiting fashion, to rotate the shafts in unison. The drive plate is controllably moved by a motor drive system that includes an orbiting motor secured to the plate and a base motor secured to a fixed substrate that houses the switches. The output shafts of the two motors are coupled together such that operation of either motor moves the orbiting motor, and thus the drive plate, in an orbiting motion about the base motor and substrate.

10 Claims, 3 Drawing Sheets

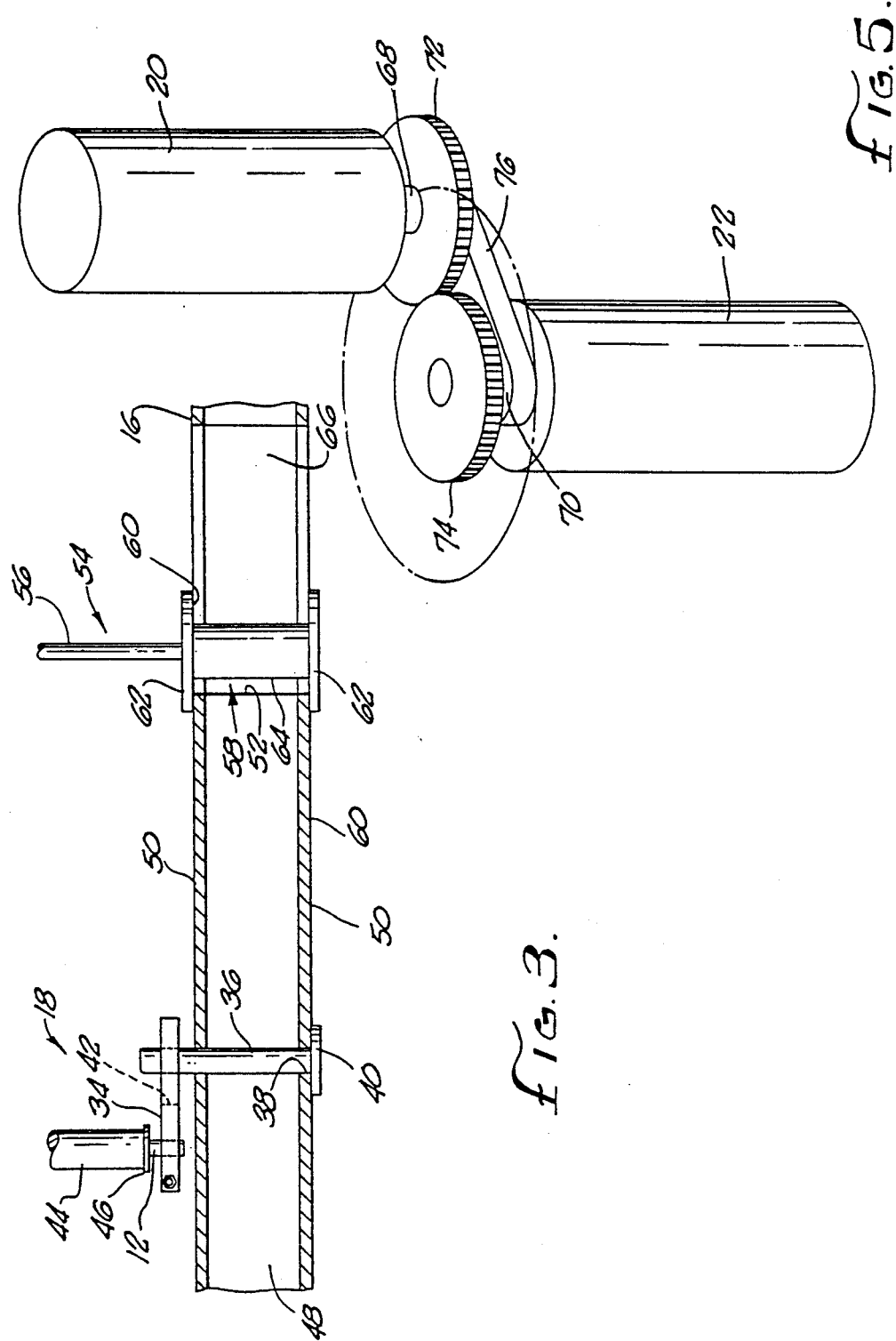

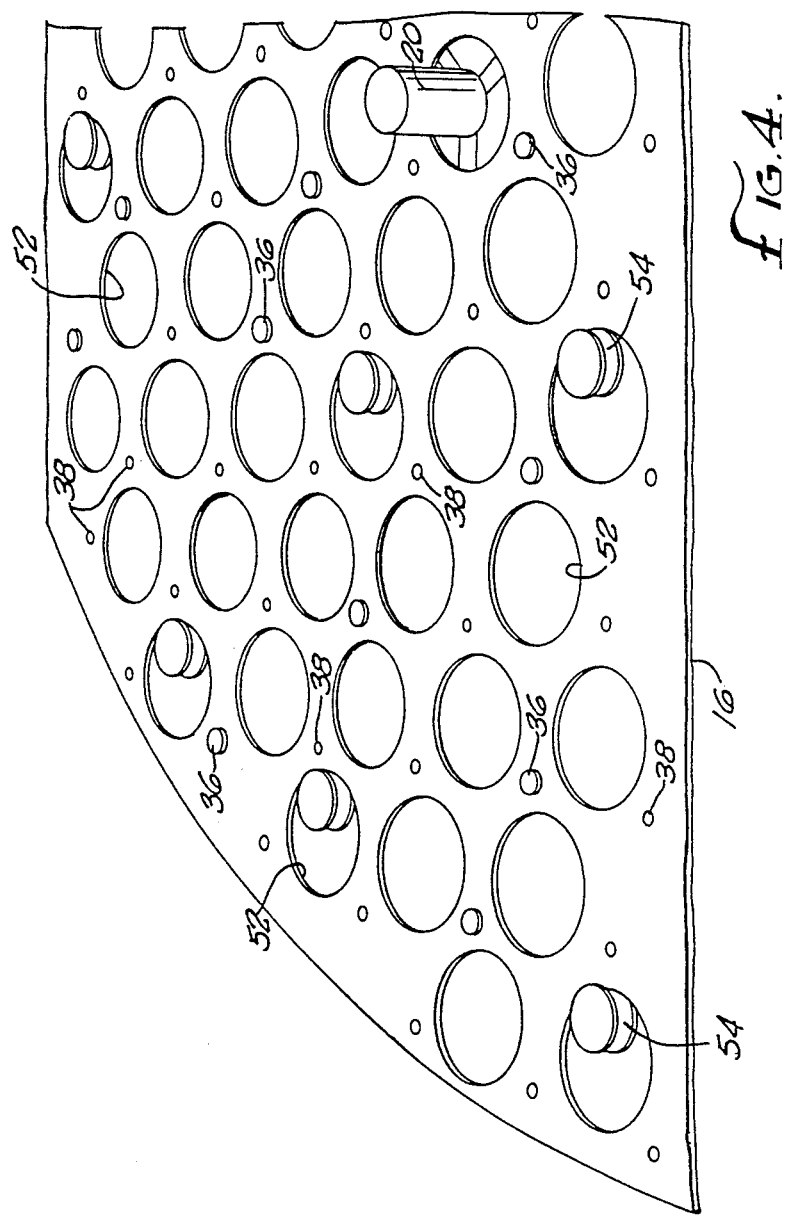

APPARATUS FOR SIMULTANEOUSLY ROTATING A PLURALITY OF PARALLEL SHAFTS

BACKGROUND OF THE INVENTION

This invention relates generally to systems for controlling the rf energy beam pattern for a communication satellite, and, more particularly, to systems for configuring an array of rf switches that feed rf energy to or from an array of -antenna feed horns.

A typical communication satellite includes one or more generally spherical or parabolic "dish" antenna reflectors for receiving and transmitting the beams of electromagnetic radiation. Many applications require the satellite to be maintained in a stationary orbit, approximately 22,300 miles above the earth's surface, with the satellite antenna reflectors continuously viewing particular geographical regions of the earth. The satellite usually has one antenna reflector for receiving an rf signal from the earth, and a separate antenna reflector for transmitting a separate rf signal back to the earth. The receiving reflector focuses the received signal onto an array of discrete feed elements, such as receive feed horns, positioned in the reflector's focal plane. Similarly, the rf signal transmitted by the transmitting reflector is provided by a similarly-aligned array of transmit feed horns.

By virtue of its particular location in the focal plane of the antenna reflector, each individual feed horn produces or receives a beam that illuminates a particular part of the earth. An entire array of feed horns, which can consist of as many as 90 feed horns, can illuminate a wide region on the earth. By activating or deactivating selected feed horns in the array, different zones of the earth can be selectively illuminated. In some satellites, the array of feed horns provides selective hemispheric coverage of three different zones, and reconfiguring of each zone pattern is controlled by an array of rf switches, each connected to a separate feed horn.

Simultaneous rotation of the rf switches to one of three positions redistributes the excitation to the feed horn array and controls the beam pattern of the antenna reflector. When reconfiguring the zone patterns, it is desirable to operate all of the rf switches at the same time, to instantaneously produce a pattern change. Thus, a switch positioner preferably rotates the switches in unison to one of three positions, to activate or deactivate selected horns and create a predetermined pattern of beam coverage for a particular zone on the earth.

Accordingly, there has existed a definite need for a switch positioner apparatus that simultaneously rotates a plurality of switches, to control the input and output of an array of satellite feed horns. The switch positioner apparatus should preferably be light in weight and small in size, and should provide reliability and redundancy in operation.

SUMMARY OF THE INVENTION

The present invention provides an apparatus for simultaneously rotating a plurality of parallel shafts that control, for example, an array of rf switches on a synchronous-orbit communication satellite. The apparatus includes a drive plate coupled to the switches, and a redundant motor drive system for orbiting the plate so as to simultaneously rotate all of the switches by equal amounts. Depending on the particular orbital position of the drive plate, and thus the positions of the switches, the satellite's antennas are configured to transmit or receive rf energy to or from unique geographical areas on the earth. The switch positioner apparatus of the present invention is lightweight for ease of mobility, occupies very little space, and operates without maintenance for many years.

More particularly, the drive plate is planar and is positioned adjacent to the backside of a substrate that supports an array of feed horns on its frontside. The feed horns lie in the focal plane of an antenna reflector for transmitting or receiving beams of rf energy. Each feed horn transmits energy to, or receives energy from, a separate rotatable rf switch. Each switch, in turn, is driven by a separate rotatable switch crank located on the backside of the substrate, for engagement with the drive plate. Each switch crank comprises a rotatable shaft generally perpendicular to the plane of the drive plate and operatively connected to the switch, a drive pin received within a corresponding hole in the drive plate, and a transverse crank arm interconnecting the rotatable shaft and drive pin.

As the plate is orbited by the redundant motor drive system, the switches are rotated in unison to one of several distinct positions. Each position directs rf energy to or from a particular set of feed horns in the array, thereby producing a particular rf beam pattern. The antenna reflector cooperates with the feed horn array to produce a corresponding pattern of energy for transmission to, or reception from, the earth.

The drive plate also is provided with a plurality of apertures, for reducing its weight, and for use in combination with a number of guide pins to stabilize the plate. The guide pins are secured to the substrate, and each is associated with a separate, selected aperture. The apertures are substantially circular, and a notched head on the protruding end of each guide pin is slidable around the perimeter of its associated aperture, as the plate is orbited by the motor drive system. In this way, the drive plate is stabilized during its orbiting motion and is held securely in place during satellite launching and other periods of high vibration. Although the drive plate has a substantial number of apertures to advantageously reduce its weight, guide pins are not provided for each aperture. Instead, the guide pins are spaced over the plate in a sufficient number and at certain locations to provide the necessary stability.

The redundant motor drive system for controllably orbiting the drive plate includes an orbiting motor mounted to the drive plate and a base motor mounted to the substrate. The output shafts of the motors are drivingly connected to each other by a pair of gears, such that operation of either motor causes the orbiting motor, and thus the drive plate, to orbit about the fixed base motor. A floating link surrounds the output shafts of the two motors to maintain the proper separation between their respective gears.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

FIG. 3 is an enlarged cross-sectional view of the circled region of FIG. 1, showing a switch crank driven by a drive plate and a guide pin associated with an aperture in the drive plate;

FIG. 4 is a perspective view of a section of the drive plate; and

FIG. 5 is an isolated perspective view of a redundant motor drive system for orbiting the drive plate.

DESCRIPTION OF THE PREFERRED EMBODIMENT

Figure 1:
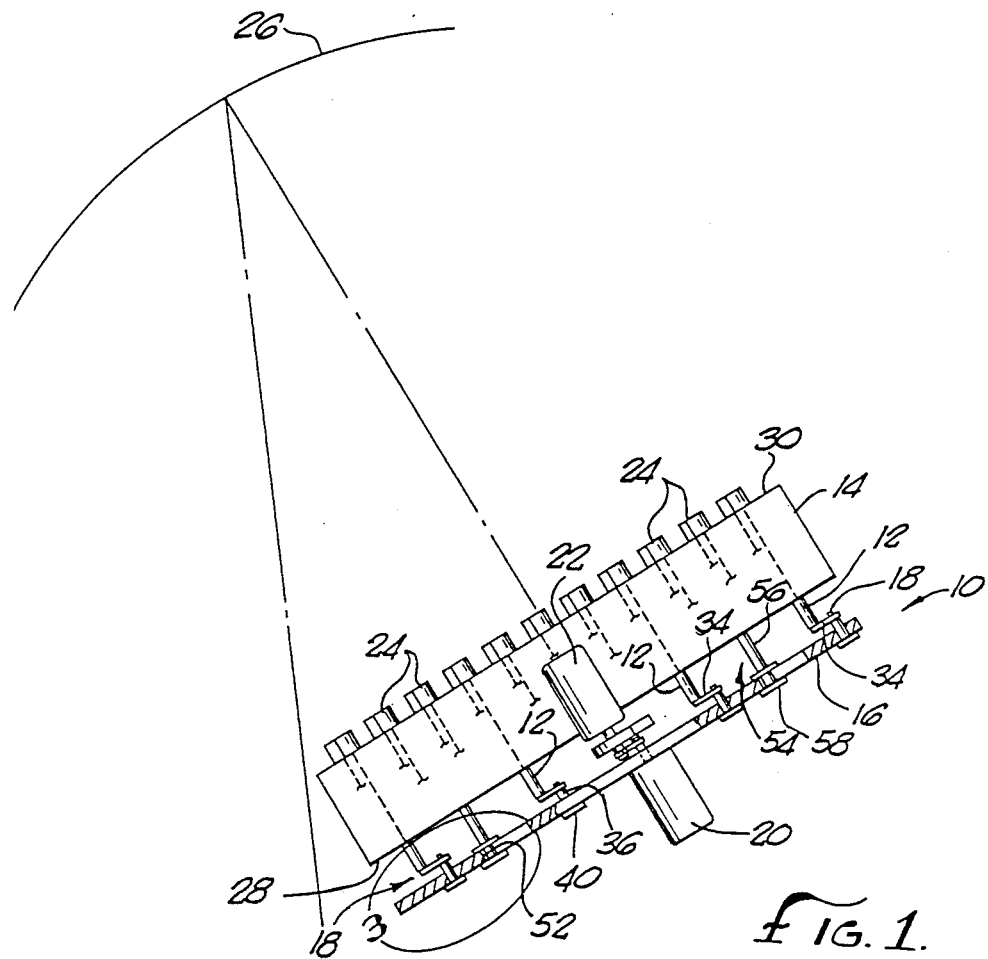
FIG. 1 is a side elevational view, partly in cross-section, illustrating the switch positioner apparatus of the present invention, for switching rf energy to or from an array of feed horns on a satellite substrate.

As shown in the accompanying drawings, the present invention is embodied in a switch positioner apparatus referred to generally by the reference numeral 10, for use in simultaneously rotating the shafts 12 of a plurality of switches (not shown) on a satellite substrate 14. The switch positioner includes a drive plate 16 coupled to a plurality of rotatable switch cranks 18, each connected to a separate switch shaft. A redundant drive system orbits the plate so as to rotate all of the switches in unison, via the cranks, by equal amounts.

Communication satellites generally have a pair of antenna reflectors for separately receiving and transmitting rf energy. In the receiving mode, one reflector receives energy from a particular geographic location on the earth and focuses it onto an array of discrete feed elements, such as receive feed horns, for subsequent amplification and retransmission. In the transmitting mode, a separate array of feed horns transmits energy to the other reflector, for transmission to a separate geographic location on the earth. Individual rf switches coupled to the separate feed horns in both the receive array and the transmit array select particular feed horns in each array to produce a predetermined pattern of beam coverage. Simultaneous rotation of the switches to one of three different positions changes the rf beam pattern, to cover different geographical regions of the earth, as desired.

FIG. 1 shows the switch positioner 10 positioned adjacent to a backside 28 of the substrate 14, which houses the rf switches 12. The feed horns 24 are arranged in a two-dimensional array on a frontside 30 of the substrate and are in the focal plane of the antenna reflector 26, which is a spherical or parabolic "dish" in the preferred embodiment. Although the precise number of feed horns 24 in the array may vary, an array having 90 to 100 feed horns has been found to provide desirable granularity for zone coverage. Spacing of feed horns in the array also may vary, and the area of the array usually is about the same size as the reflecting region of the antenna reflector.

Although FIG. 1 depicts only a single feed horn array 24 and a single antenna reflector 26, it will be appreciated that the actual satellite generally includes two of each, one for receiving rf energy and the other for transmitting rf energy. When transmitting, beams of rf energy are emitted from the individual feed horns and then reflected by the antenna reflector onto a selected geographic area or zone on the earth. When receiving, on the other hand, the reflector receives rf energy from a different selected zone on the earth and focuses it onto the array of feed horns. Alternatively, a single feed horn array and reflector can be used, with the transmitted energy and received energy being orthogonally polarized.

The rf switch (not shown) for each feed horn 24 is rotated via its shaft 12 by a separate crank 18. As best shown in FIG. 3, each switch crank includes the rotatable shaft 12, which is generally perpendicular to the plane of the drive plate 16 and substrate 14, a drive pin 36 engaged by the drive plate, and a transverse crank arm 34 interconnecting the rotatable shaft and pin. The drive pin, like the shaft, is preferably perpendicular to the plane of the drive plate, with the crank arm connecting and separating the two by a predetermined distance, to permit rotation of the crank with a minimum force.

Each drive pin 36 is received in a separate one of a plurality of corresponding holes 38 formed in the drive plate 16. The pin has a flat head or overhanging portion 40 at its outer end, to prevent the drive pin from falling through or disengaging from the drive plate. In one preferred form, one end of the crank arm is provided with a U-shaped slot configuration 42 for slidably receiving the drive pin, thereby minimizing tolerance problems when all of the switch cranks are ganged to the drive plate. A bushing 44 and a collar 46 also may be provided for each crank 18, to space the crank arm 34 from the substrate 14. The switch crank may be fabricated from rigid lightweight materials, such as aluminum or plastic.

The drive plate 16 is extremely light in weight and has a sandwich-like construction, as best shown in FIG. 3, comprising a core 48 of lightweight material enclosed by a pair of thin outer face sheets 50. The core preferably is constructed from aluminum honeycomb and has a thickness of approximately 0.25 inch, while the outer face sheets may be constructed from thin sheets of aluminum or other suitable material, having a thickness of approximately 0.01 inch. The drive plate also has a plurality of apertures 52 spaced uniformly around the plate, for reducing the weight of the plate even further. The apertures, which are substantially circular in the preferred embodiment, also provide another important function of facilitating stabilization of the drive plate during orbiting of the plate, and during satellite launching and other periods of increased vibration.

Figure 2:
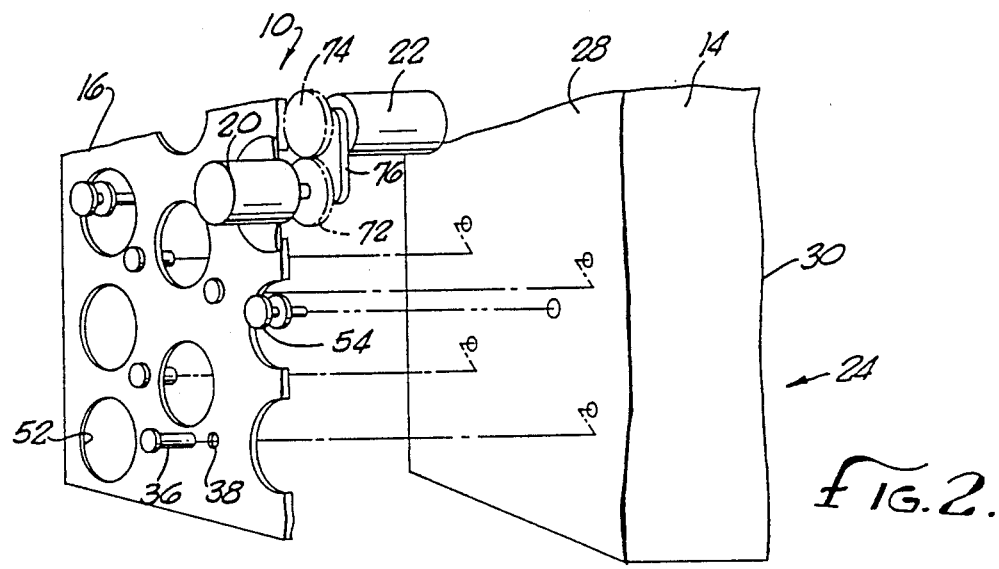
FIG. 2 is a perspective schematic view of the switch positioner apparatus, showing the relative position of its various elements.

As best shown in FIGS. 2-4, a plurality of guide pins 54 are spaced around the drive plate 16 for stabilizing the plate, as indicated above. The guide pins include a rod 56 projecting rearwardly from the backside 28 of the substrate 14, and a notched head 58 at the rods's remote end. The notched head is adapted for sliding reception around the portion 60 of the plate adjacent to the apertures, and a pair of preferably circular retainers 62 are spaced by a spacer 64 to create a channel or groove 66 for engaging the plate. Thus, as the plate is orbited to rotate the switch cranks 18, the aperture edges will fit into and slide within the retainers, which thereby limits out of plane movement of the plate.

Preferably, a light frictional fit is established between the retainers 62 and the drive plate 16. The guide pins 54 are constructed from rigid non-metallic materials, and the retainers are compliant. Thus, during launching of the satellite and other periods of high vibration, the retainers will engage the outer face sheets 50 of the plate to stabilize it relative to the substrate 14. Guide pins need not be provided for all apertures. Stability of orbital movement and rigidity during periods of high vibration can be provided with only a relatively small number of guide pins. In this regard, it has been found that a higher concentration of guide pins is needed around the outer periphery of the drive plate 16 than in the inner central area.

As previously mentioned, a redundant motor drive system orbits the drive plate 16 with respect to the substrate 14. This motor drive system, which is depicted best in FIGS. 2 and 5, includes an orbiting motor 20 mounted on the drive plate and a base motor 22 mounted on the substrate. The output shafts 68 and 70 of the two motors preferably are substantially parallel to each other and face in opposite directions, to define a common plane between the substrate and the drive plate. The output shafts are linked by a pair of drive gears 72 and 74 connected to their respective shafts, and a floating link 76 connects the two shafts, to maintain a proper separation between the gears. The switch positioner apparatus further includes a pair of idlers (not shown in the drawings) that cooperate with the floating link to establish the desired orbit. Either stepper motors, direct current brush motors or other suitable motors may be used, and a 90°, four-phase stepper motor is preferred. It is understood that at the motor gearheads, there must be sufficient torque to overcome the combined drag of the drive plate and the ganged switch cranks 18, as well as sufficient torque capacity to provide a margin of safety needed in typical satellite applications.

Operation of either motor 20 or 22 causes the orbiting motor 20, and thus the drive plate 16, to orbit around the base motor 22, as illustrated by the dashed circular line in FIG. 5. The range of orbit of the plate is limited by the radius of the various switch cranks 18, which are defined by the length of the corresponding crank arms 34. Thus, it follows that the radius of the apertures 52 and the distance between the output shafts 68 and 70 of the motors also must be substantially equal to the crank arm length. Drive plate position information may be provided by redundant conductive plastic potentiometers (not shown), to control orbiting of the plate through the satellite's usual telemetry and command functions.

A significant advantage of the present invention is its simple construction and lightweight characteristics. For example, a switch positioner for rotating between 90 and 100 switches, including the drive plate, motors and associated hardware, weighs only about 6.5 pounds. Moreover, reliable motor redundancy is conveniently achieved without the need for a complex differential gearing system.

While a particular form of the invention has been illustrated and described, it will be apparent that various modifications can be made without departing from the spirit and scope of the invention. Accordingly, the invention is defined only by the appended claims.

What is claimed is:

1. An apparatus for simultaneously rotating a plurality of substantially parallel shafts, comprising:
   a substrate to which said shafts are rotatably connected;
   a drive plate;
   means for coupling the plate to the shafts;
   a first motor secured to the plate; and
   a second motor secured to the substrate and drivingly coupled to the first motor, such that actuation of either motor orbits the plate in the prescribed fashion.

2. The apparatus of claim 1, wherein the first motor is coupled to the second motor by gear means.

3. The apparatus of claim 1, wherein operation of the first or second motor causes the first motor and the plate to orbit with respect to the second motor.

4. A rotation apparatus comprising:
   a drive plate;
   a substrate;
   a first motor secured to the plate; and
   a second motor secured to the substrate and drivingly coupled to the first motor, such that operation of either one of the first or second motors orbits the plate relative to the substrate.

5. The apparatus of claim 4, wherein the first motor is coupled to the second motor by gear means.

6. The apparatus of claim 4, wherein operation of either the first or second motor causes the first motor, and thus the plate, to orbit around the second motor.

7. The apparatus of claim 5, wherein the first motor is further coupled to the second motor by a floating link surrounding output shafts of the first and second motors.

8. An apparats for simultaneously rotating a plurality of substantially parallel shafts, comprising:
   a substrate to which said shafts are rotatably connected;
   a drive plate;
   a plurality of switch cranks, each including a drive pin connected to the plate;
   a transverse crank arm interconnecting each shaft to a corresponding drive pin; and
   means for orbiting the plate so as to simultaneously rotate all of the shafts by equal amounts.

9. An apparatus for simultaneously rotating a plurality of substantially parallel shafts comprising:
   a substrate, said shafts being rotatably connected to said substrate;
   a drive plate including a plurality of substantially circular apertures located across its surface;
   means for coupling said drive plate to said shafts;
   a plurality of guide pins each having one end secured to said substrate and an opposite end slidably engageable with a portion of said plate adjacent a corresponding aperture for stabilizing said plate with respect to said substrate; and
   means for orbiting said plate so as to simultaneously rotate all of said shafts by equal amounts.

10. A switch positioner for simultaneously rotating a plurality of switches, comprising:
    a substrate for supporting said switches;
    a drive plate;
    means for coupling said plate to said switches;
    a first motor mounted on said drive plate;
    a second motor mounted on said substrate; and
    gear means for drivingly coupling together said first and second motors such that operation of either said first motor or said second motor orbits said drive plate relative to said substrate and thus rotates said switches in unison.

* * * * *